(12) United States Patent
Davies et al.

(10) Patent No.: US 7,778,794 B2
(45) Date of Patent: Aug. 17, 2010

(54) SYSTEM AND METHOD FOR IDENTIFYING AN ELEMENT OF A STRUCTURE IN AN ENGINEERED ENVIRONMENT

(75) Inventors: Paul Robert Davies, Huntington Beach, CA (US); Anthony E. Majoros, Cypress, CA (US)

(73) Assignee: The Boeing Company, Chicago, IL (US)

( * ) Notice: Subject to any disclaimer, the term of this patent is extended or adjusted under 35 U.S.C. 154(b) by 97 days.

(21) Appl. No.: 11/944,960

(22) Filed: Nov. 26, 2007

(65) Prior Publication Data

US 2009/0138230 A1 May 28, 2009

(51) Int. Cl.
*G01C 9/00* (2006.01)
(52) U.S. Cl. ............... 702/150; 702/153; 702/152; 340/825.49; 340/933; 342/464; 342/463; 342/450; 342/457; 342/451; 342/453
(58) Field of Classification Search ............ 702/150, 702/152, 153; 701/209; 340/825.49, 933; 342/464, 463, 450, 457, 453, 451
See application file for complete search history.

(56) References Cited

U.S. PATENT DOCUMENTS

| | | | | |
|---|---|---|---|---|
| 4,642,786 A | * | 2/1987 | Hansen | .............. 702/153 |
| 6,526,399 B1 | * | 2/2003 | Coulson et al. | ............. 707/1 |
| 7,061,429 B2 | * | 6/2006 | Fager et al. | ............. 342/464 |
| 7,236,880 B2 | * | 6/2007 | Fager et al. | ............. 701/209 |
| 2004/0148125 A1 | * | 7/2004 | Fager et al. | ............. 702/150 |
| 2007/0073439 A1 | * | 3/2007 | Habibi et al. | ............. 700/213 |

OTHER PUBLICATIONS

"MAXIM, What is an iButton—Maxim/Dallas"; Website found at http://www.maxim-ic.com/products/ibutton/ibuttons. Downloaded Oct. 29, 2007; pp. 1-3.

* cited by examiner

*Primary Examiner*—Carol S Tsai
(74) *Attorney, Agent, or Firm*—Alston & Bird LLP (57) ABSTRACT

A system and method are provided in which an element of a structure may be reliably identified. For example, a system may include a part selection element configured to interact with at least one positional marker having a predefined location. The part selection element is also configured to select at least a portion of a structure, with the structure being positioned at a predetermined location and orientation. The part selection element may also be configured to identify a depth within the structure. The system also includes a computing device configured to identify an element of the structure based upon the position and orientation of the part selection element and the portion of the structure selected by the part selection element. In instances in which a depth is identified, the computing device may also be configured to identify the element of the structure at the depth identified within the structure.

20 Claims, 3 Drawing Sheets

SYSTEM AND METHOD FOR IDENTIFYING AN ELEMENT OF A STRUCTURE IN AN ENGINEERED ENVIRONMENT

FIELD OF THE INVENTION

Embodiments of the present invention relate generally to systems and methods for identifying portions of a structure and, in particular, to systems and methods for identifying elements of a structure in an engineered environment in which the elements of the structure are assembled in a defined manner.

BACKGROUND OF THE INVENTION

It is desirable in many applications to be able to identify the constituent elements of a structure. For example, it may be desirable during the training of assembly or maintenance personnel to identify the constituent elements of a structure so that the assembly or maintenance personnel can thereafter have a better appreciation for the appearance and the identity of various elements as well as the manner in which the various elements interact with and are interconnected to other elements of the structure. Additionally, it is also desirable to be able to readily identify the constituent elements of a structure during an inspection of the structure.

As described below, even in an engineered environment in which the elements of a structure are assembled in a predefined manner and in predefined relative locations with respect to the other elements of the structure, it may be difficult to individually identify the constituent elements of a structure. Indeed, in some instances, the elements may be internal to the structure and not visible once the structure has been assembled. Moreover, even in instances in which the elements are visible, an individual may not recognize the elements simply by their appearance. For example, an aircraft has a large number of constituent elements, many of which are not visible once the aircraft has been assembled and the sheer number of which make it challenging for an individual to even identify all of those elements that are visible following assembly of the aircraft.

In an effort to facilitate the identification of the constituent elements of a structure, personnel could be trained to identify the elements, such as by means of their review of drawings or other images of the elements, based upon the visual appearance of the elements and the location of the elements relative to other constituent elements of the structure. Although such training may to some degree be effective, this training is typically quite time-intensive and may still be somewhat limited as the appearance of an element of an assembled structure may still prove to be somewhat difficult for a trainee to identify in comparison to the drawings and images of the structures that are utilized for training purposes.

Instead or additionally, the various elements of a structure could be identified in some manner, such as by means of color coding or by labeling the elements, either with human-readable labels or other markings or with bar-codes, radio frequency identification (RFID) tags or the like. While the color coding of the constituent elements of a structure may have some use for structures having a limited number of elements, such as in instances in which wiring or fluid/gas tubes are to be identified, color coding is typically too limited in the practical variety of colors and may be further limited by changes in the color of an element over time or once the element is subject to wear so as to fail to provide adequate discrimination between the plurality of elements that may comprise a particular structure. In terms of the identification of individual elements of a structure by means of labels, the labels may provide some assistance, although the identification of the various elements may be somewhat limited by the size and shape of the elements and issues relating to the occlusion and corresponding limitations on the readability of the labels in instances in which the elements of an assembled structure are at least partially hidden from view. Additionally, the application of labels to the elements of a structure adds at least some expense and weight to the structure and, at least with respect to RFID or other proximity-based identification techniques, difficulties may arise in instances in which the RFID tags for two or more elements are positioned close to one another since efforts to read any one RFID tag may result in some confusion as a result of responses from two or more RFID tags associated with nearby elements of the structure.

Accordingly, it would be desirable to provide an improved technique for identifying the constituent elements of a structure and, in some instances, to provide various types of information relating to the identified element(s) of the structure, thereby facilitating training of personnel, be it for assembly, maintenance, inspection or other purposes.

BRIEF SUMMARY OF THE INVENTION

A system and method are thereby provided according to embodiments of the present invention in which an element of a structure may be identified and, in some instances, information relating to the identified element may be provided without resort to labels, color coding or other physical or visible indicia carried by the elements. Moreover, the information that may be provided with respect to the element that has been identified may be tailored based upon the purposes of the identification and may, in some instances, include computer-aided design (CAD) drawings, maintenance information and the like so as to facilitate training of assembly and maintenance personnel, inspection of the structure or the like.

In one aspect of the present invention, a system is provided that includes a part selection element, such as a pointing device, configured to interact with at least one positional marker having a predefined location. The part selection element is also configured to select at least a portion of a structure, with the structure being positioned at a predetermined location and orientation. In one embodiment, the part selection element may also be configured to identify a depth within the structure. The system of this embodiment also includes a computing device in communication with the part selection element and configured to identify an element of the structure based upon the position and orientation of the part selection element and the portion of the structure selected by the part selection element. Additionally, at least one of the part selection element or the computing device is also configured to determine both the position of the part selection element relative to the predefined location of a respective positional marker and an orientation of the part selection element. In instances in which the part selection element has also identified a depth within the structure, the computing device may also be configured to identify the element of the structure at the depth identified within the structure.

In one embodiment, the computing device also includes memory for storing information relating to the structure such that the computing device is configured to identify the element of the structure based upon the information stored by the memory relating to the structure. For example, the memory may be configured to store information relating to CAD drawings of the structure such that the computing device is configured to identify the element of the structure that has been selected by the part selection element by providing a CAD drawing of the element.

The system of one embodiment also includes at least one positional marker having a predefined position and being configured to communicate with the part selection element. The at least one positional marker and the structure are disposed in a predefined positional relationship with respect to one another. As such, the predefined location of the at least one positional marker and the predetermined location and orientation of the structure may each be defined in either absolute terms or in relative terms with respect to one another.

In accordance with another aspect of the present invention, a method of identifying an element of a structure is provided. The method initially determines both the position of a part selection element relative to a predefined location defined by a respective positional marker and an orientation of the part selection element. The method also selects at least a portion of the structure, such as by pointing the part selection element at the portion of the structure, with the structure being positioned at a predetermined location and orientation. In this regard, the positional marker and structure may be disposed in a predefined positional relationship with respect to one another. The method further includes the identification of an element of the structure based upon the position and orientation of the part selection element and the portion of the structure identified by the part selection element.

In one embodiment, for example, the selection of at least a portion of the structure may also include the identification of a depth within the structure such that the identification of the element of the structure identifies the element of a structure at the identified depth within the structure.

The method may also include storing information relating to the structure. As such, the identification of the elements of the structure may be based upon the information that is stored relating to the structure. For example, the information that is stored may include information relating to CAD drawings of the structure. In this embodiment, the elements of the structure may be identified by providing a CAD drawing of the element.

According to another aspect of the present invention, a system is provided that includes a part selection element, such as a pointing device, configured to select at least a portion of the structure that is positioned at a predetermined location and orientation. Further, the part selection element is configured to identify a depth within the structure. The system of this embodiment also includes a computing device in communication with the part selection element and configured to identify an element of the structure at the depth identified within the structure based upon the positional orientation of the part selection element and the portion of the structure selected by the part selection element. Additionally, at least one of the part selection element or the computing device is also configured to determine both the position of the part selection element relative to the predefined location of a respective positional marker and an orientation of the part selection element.

The computing device may also include memory for storing information relating to the structure such that the computing device may be configured to identify the elements of the structure based upon the information stored by the memory. For example, the memory may be configured to store information relating to CAD drawings of the structure such that the element may be identified by providing a CAD drawing of the element. Additionally or alternatively, the memory may be configured to store information relating to a maintenance procedure for the structure. As such, the computing device of this embodiment may be configured to identify the element of the structure by providing at least a portion of the maintenance procedures relating to the element.

The system of this embodiment may also include at least one positional marker having a predefined position and configured to communicate with the part selection element. As such, the part selection element of this embodiment may be configured to determine the position of the part selection element at least partially based upon the predefined position of the at least one positional marker. Additionally, the at least one positional marker and the structure may be disposed in a predefined positional relationship with respect to one another. As such, the predetermined location and orientation of the structure may be defined in either absolute terms or relative terms with respect to at least one positional marker.

In accordance with embodiments of the present invention, the system and method may facilitate the identification of one or more elements of the structure including both those elements that are visible once the structure has been assembled and those elements that are at a depth within the assembled structure and, as a result, may be not be seen. Based upon the selection of an element of a structure, the element may be identified and, in some embodiments, information relating to the element, such as a CAD drawing, maintenance procedures or the like, may be provided. As such, training of assembly and maintenance personnel, inspection of the structure and other activities may be facilitated.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
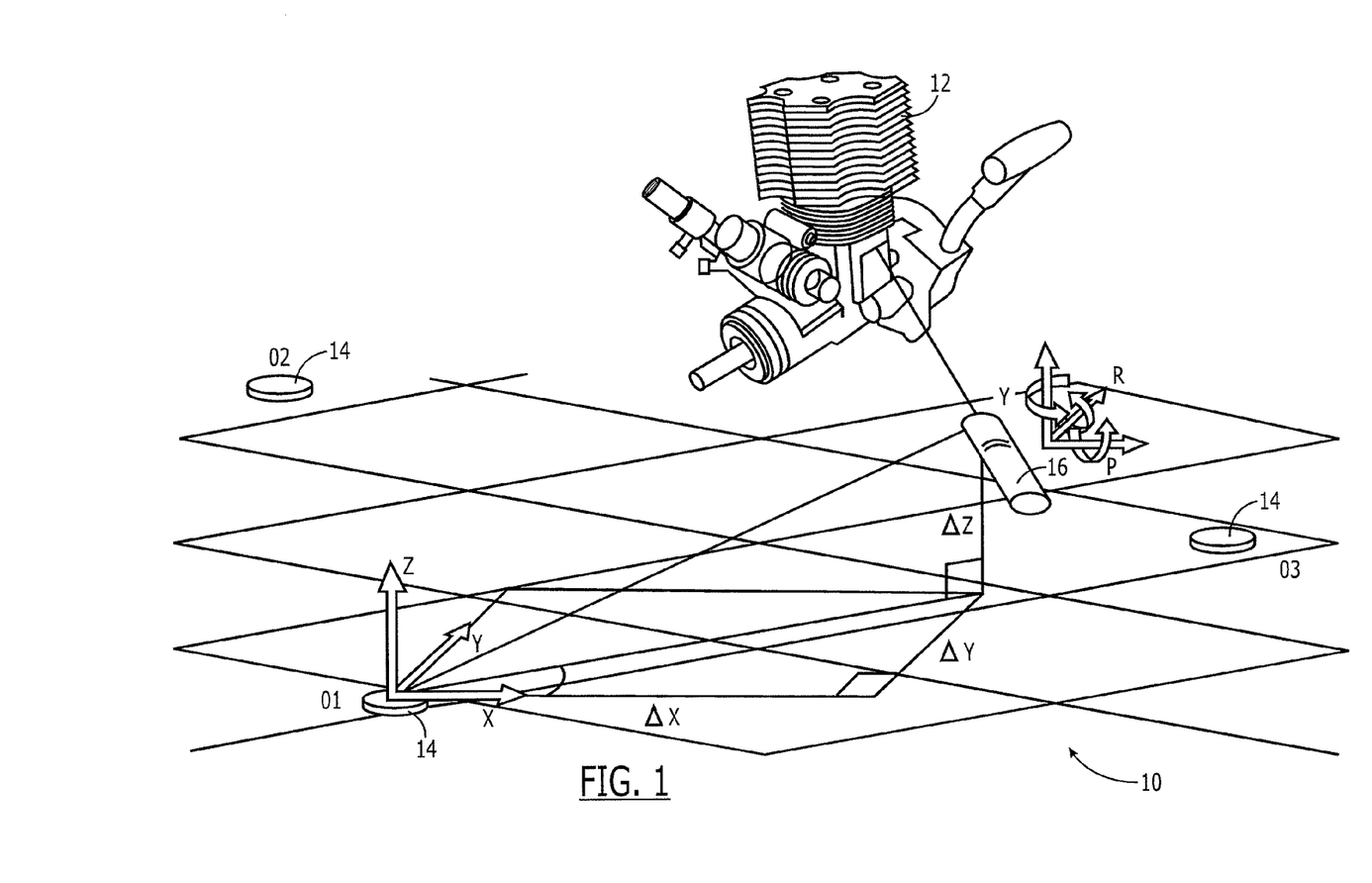
FIG. 1 is a schematic representation of a system for identifying an element of a structure in accordance with one embodiment of the present invention.

Referring now to FIG. 1, a system 10 for identifying an element of a structure 12 is depicted. Typically, the structure is the product of an engineered environment in which the elements of the structure are assembled in a predefined manner such that the constituent elements are positioned and oriented in a predefined manner with respect to one another and with respect to the structure as a whole. While the system and method of embodiments of the present invention are advantageous for identifying individual elements of a structure that includes a large number of elements, including at least some elements that are not visible following assembly of the structure, the system and method of embodiments of the present invention may also identify the elements of simpler structures having only one or a few elements with either most or all of those elements being visible following assembly of the structure. Moreover, the structure may be designed for use in a wide variety of applications. For example, the structure may be an aircraft that is comprised of thousands of elements. Alternatively, the structure could be a single subsystem or other subset of components of an aircraft. Although an aircraft or a portion of an aircraft is one example of a structure from an engineered environment that is comprised of a number of individually identifiable elements, the structure may be designed for a wide variety of other engineered environments, including ground vehicles, ships, spacecraft, or other non-vehicular applications, such as fluid/gas tubes or the like.

Figure 2:
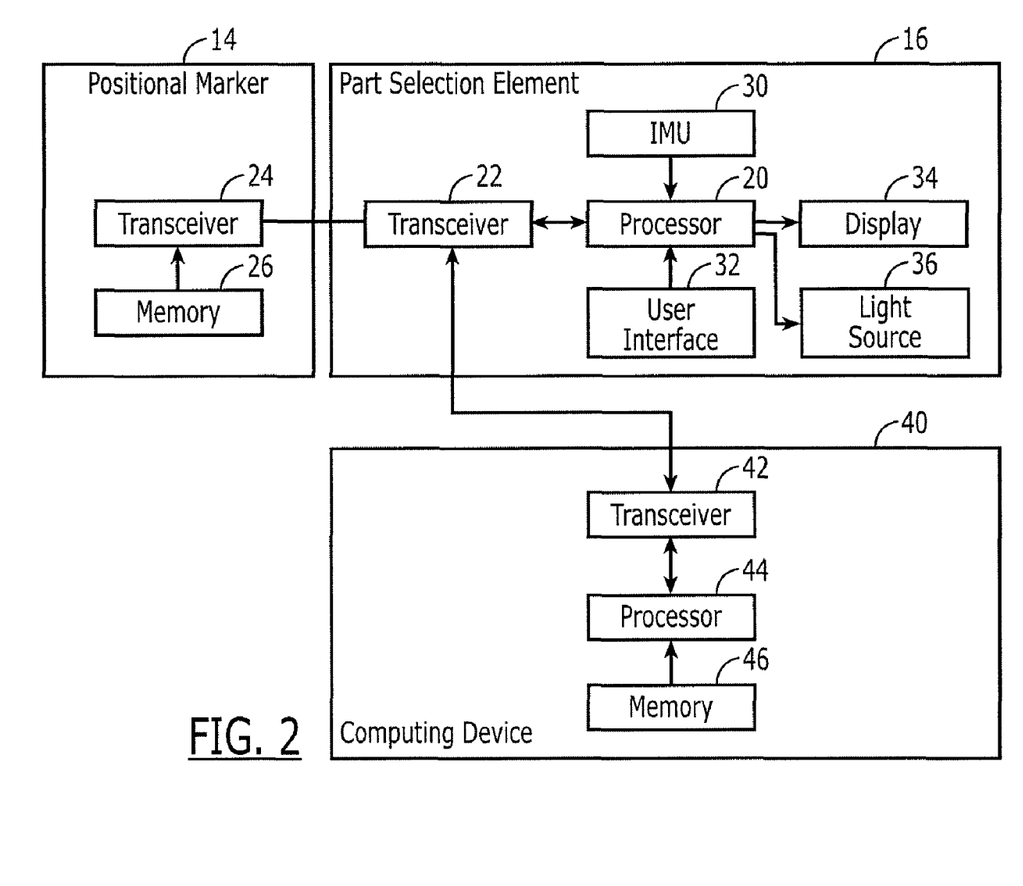
FIG. 2 is a block diagram of a system for identifying an element of a structure in accordance with one embodiment of the present invention.

As shown, the system 10 of one embodiment includes one or more positional markers 14 designated O1, O2 and O3 in FIG. 1. In this regard, the system of the illustrated embodiment includes three positional markers at different spaced-apart locations. However, the system may include more or fewer positional markers in other embodiments. Each positional marker has a predefined location. As shown in FIG. 2, for example, each positional marker may include a memory 26, such as a register or the like, for storing the predefined location of the positional marker or for storing the identity of the positional marker with the location of the positional marker being determinable, as described below, based upon its identity. Further, each positional marker may include a transceiver for facilitating external communications as described below, such as to transmit the identity of the positional marker and/or the location of the positional marker. Similarly, the structure 12 is positioned at a predetermined location and orientation. The location of each of the positional markers and the structure itself may be defined in absolute terms, such as an x-y-z position relative to some predefined origin or the like. Alternatively, the positional markers and the structure may be disposed in a predefined positional relationship with respect to one another such that the predefined locations of the positional markers and the predetermined location of the structure itself are defined in relative terms with respect to one another. Moreover, while the positional markers and the structure are depicted in FIG. 1 to be spaced apart from one another, one or all of the positional markers may be disposed upon or attached to the structure in other embodiments.

The system 10 of the embodiment depicted in FIG. 1 also includes a part selection element 16. To facilitate use of the system in the field, the part selection element may be a handheld pointing device, such as a pointing device, that is configured to perform the various functions described below. As shown in FIG. 2, for example, the part selection element generally includes a processor 20, such as a microprocessor, a controller, an application-specific integrated circuit (ASIC) or other computing or logic device, for generally controlling the operation of, and performing a number of the functions of, the part selection element. The part selection element also generally includes a transceiver 22 or at least a receiver for interacting with one or more of the positional markers 14. More specifically, the transceiver 24 of the part selection element may be configured to communicate with the transceiver of the respective part selection element. In this regard, the part selection element may be positioned proximate and, more typically, in contact with a respective positional marker, and the part selection element may then be actuated. The part selection element may be actuated in various manners, such as by a user touching a hard or soft key, in order to direct the communication with the respective positional marker. In this regard, the part selection element is configured to receive either an identification of the respective positional marker and/or an indication of a predefined location of the respective positional marker. For example, the positional marker may be an iButton® product available from Maxim Integrated Products that provides its unique identification to the part selection element. The part selection element or an associated computing device 40, as described below, may have the predefined location that is associated with the identified positional marker stored in memory such that the predefined location of the respective positional marker and, in turn, the current location of the part selection element (as a result of the positioning of the part selection element at the respective position marker) may be identified based upon the identification of the respective positional marker.

The part selection element 16 and the positional markers 14 can communicate in a variety of manners. For example, the part selection element and the positional markers may communicate wirelessly, such as by means of a Blue Tooth® or other proximity-based communication technique. As such, the transceiver 22 of the part selection element of this embodiment would include a Blue Tooth or other wireless transceiver for communicating with the corresponding transceiver 24 of the positional markers. Alternatively, the part selection element may communicate with the positional markers by means of a wired connection, such as the wire interface designed to communicate with an iButton® product. As such, the transceiver of the part selection element of this embodiment is configured to support wireline communications with the positional markers.

As noted above and also depicted in FIG. 2, the part selection element 16 can include a user interface 32, such as for permitting the user to indicate that the part selection element is positioned proximate to or in contact with a respective positional marker 14 in order to prompt the part selection element to determine the identify and/or the position of the respective positional marker. The user interface may include a keypad consisting of one or more keys and/or a display 16 that may function as a touch screen for receiving user input and/or may provide the indicia associated with one or more soft keys for similarly receiving user input. Both the user interface and the transceiver are generally also disposed in communication with the processor 20 for coordinating the operation thereof.

Once the part selection element 16 has interacted with a respective positional marker 14 so as to identify the respective positional marker and/or the predefined location of the respective positional marker, the part selection element may be moved so as to point to or otherwise identify the element of the structure 12 that is of interest. In order to identify the element of interest, the position and the orientation of the part selection element are determined. As such, the predefined location of the respective positional marker is essentially utilized as an origin or a reference location for the part selection element with the movement of the part selection element relative to that reference location then being determined or tracked so as to permit the current location and orientation of the part selection element to be determined. The position and orientation of the part selection element may be determined in various manners.

For example, the part selection element 16 may include an inertial measurement unit (IMU) 30 having six degrees of freedom, thereby permitting a determination of the position of the part selection element relative to the predefined location of the respective positional marker along each of three mutually perpendicular axes designated the x, y and z axes, while also permitting the orientation of the part selection element to be determined based upon the rotation about each of the x, y and z axes and, in turn, the roll, pitch and yaw of the part selection element. Although inertial measurement units may have various configurations as known to those skilled in the art, the inertial measurement unit of one embodiment includes three linear accelerometers disposed to detect linear acceleration along each of three mutually perpendicular axes, three rate gyroscopes configured to determine the rate of rotation about each of the three mutually perpendicular axes and two magnetic sensors. By performing double integration of the outputs of the linear accelerometers, such as by means of a processor onboard the initial measurement unit or by the processor 20 of the part selection element, the three-dimensional position of the part selection element relative to the predefined location of the positional marker 14 which serves as the reference location can be determined.

As to orientation, the user may be instructed to provide an initial orientation by orienting the part selection element 16 in a predefined orientation at the time of interaction with the positional marker 14. Alternatively, the initial orientation may be determined by the embodiment of the inertial measurement unit 30 based upon information regarding the earth's magnetic field that is provided by the magnetic sensors. Taking the initial orientation into account, the roll, pitch and yaw of the part selection element and, in turn, the orientation of the part selection element at times following its interaction with the positional marker may be determined integrating the outputs of the three rate gyroscopes.

While the data from which the current position and orientation of the part selection element 16 may be determined may be provided by an initial measurement unit 30, the part selection element can include other types of tracking devices for providing the data from which the current position and orientation of the part selection element may be determined relative to the initial reference location defined by the respective positional marker 14. As known to those skilled in the art, for example, other types of tracking devices include mechanical tracking devices which physically connect the part selection element to the reference location, such as that defined by the respective positional marker, with jointed linkages or the like, magnetic tracking devices that determine the strength and orientation of a pulsed magnetic field in order to determine the current location and orientation of the part selection element, sourceless non-inertial tracking devices that utilize passive magnetic sensors referenced to the earth's magnetic field to determine the current location and orientation of part selection element, optical tracking devices, acoustic tracking devices or the like. Regardless of the type of tracking device, the part selection element provides either its current location and orientation or at least the underlying data from which its current location and orientation can be determined to the computing device 40, as described below.

As such, by initially positioning the part selection element 16 at a respective positional marker 14, the predefined location of the respective positional marker may serve as the reference location such that subsequent movement of the part selection element from the positional marker can be tracked in order to determine the current location and orientation of the part selection element. Since the location and orientation of the structure 12 is also predetermined, at least with respect to the positional markers, the relative position and orientation of the part selection element with respect to the structure may also be determined, such as by means of either the part selection element or the computing device 40 as described below. The part selection element is also configured to select at least a portion of the structure. The part selection element may select the portion of the structure in various manners, but in one embodiment in which the part selection element is a pointing device, the part selection element is configured to select the portion of the structure by pointing a predetermined portion of the part selection element, such as one end of the part selection element, at the portion of the structure that is to be selected and then triggering the selection, such as by actuating a hard or soft key from the user interface 32. Since the current location and orientation of the part selection element and the location and orientation of the structure are known, the portion of the structure that is identified by the part selection element, such as the portion of the structure that is pointed at by the part selection element, may be identified.

Although not necessary for the actual identification of the portion of the structure that is selected, the part selection element can include a laser or other light source 36 that is driven by the processor 20 in response to the trigger for producing a beam of light that extends from the part selection element in the same direction in which the part selection element is pointed. As such, the portion of the structure upon which the beam of light falls will also provide visible feedback to the user regarding the portion of the structure that is being identified even though the actual identification is based upon the current position and orientation of the part selection element and the location and orientation of the structure without consideration of any interaction of the beam of light with the structure itself.

As described above, a number of structures 12 are comprised of an assembly of elements so that at least some of the elements are disposed within the resulting structure in such a manner that the elements are no longer visible. In order to permit the identification of these interior elements, the part selection element 16 can also be configured to identify a depth within the structure. The depth within the structure may be identified in various manners including, for example, via the user interface 32 of the part selection element. In this regard, the part selection element of one embodiment can present a question upon the display 34 of the part selection element that asks the user if the element of the structure that is to be selected is at the surface of the structure. If the user indicates that the element is at the surface of the structure, the element of the structure can be correspondingly identified based upon the current location and orientation the part selection element and the location and orientation of the structure. However, if the user indicates that the element that is to be selected is not at the surface of the structure, the first selection element can ask the user to provide the depth within the structure for the respective element. The user can then enter the depth via a keypad or the like. Alternatively, the part selection element can include a slider that may serve as another form of user interface and that may be slideably positioned so as to identify the relative depth within the structure at which the element in question is positioned. Still further, the part selection element may be configured to receive the depth of the element in question in a variety of other manners. For example, the depth may be defined by an actual depth value, such as 5 inches from the surface of the structure, by a percentage depth with 0% representing the surface of the structure and 50% representing the middle of the structure, or by other measures if so desired. In instances in which the element to the structure to be identified is at a depth within the structure, the identification of the element of the structure is not only based upon the current location and orientation of the part selection element and the location and orientation of the structure, but is also based upon the depth of the element within the structure.

As shown in FIG. 2, the system 10 of one embodiment also includes a computing device 40, such as a personal computer, workstation, server or other form of computing device, that includes a processor 44, such as a microprocessor, a controller, an application-specific integrated circuit (ASIC) or other computing or logic device, for generally controlling the operation of, and performing a number of the functions of, the computing device. The computing device is in communication with the part selection element 16 and is configured to identify the element of the structure that has been selected. The computing device and the part selection element may communicate in various manners, such as by means of respective transceivers 42, 22. For example, the part selection element and the computing device may each include a wireless transceiver for facilitating wireless communication therebetween. Alternatively, the part selection element and the computing device may communicate via a wireline connection. Still further, the part selection element and the computing device may each be comprised of a common computing device, such as a handheld computing device, such as a personal digital system (PDA) or the like.

Regardless of this configuration, the computing device 40 is configured to identify the elements of the structure 12 that has been selected based upon the current position and orientation of the part selection element 16 and the portion of the structure selected by the part selection element which, in turn, is also defined by the location and orientation of the structure itself. In instances in which the portion of the structure that has been selected is at a depth within the structure, the computing device also identifies the element of the structure based upon the depth of the element within the structure. As noted above, the structure is generally the product of an engineered environment such that the constituent elements of the structure are positioned and oriented in a predefined manner with respect to one another and with respect to the structure as a whole. Since both the location and orientation of the structure and the current location and orientation of the part selection element are known, the computing device can determine the element that is identified by the part selection element by determining the portion of the structure that is selected by the part selection element, such as that portion of the structure that is pointed at by the part selection element, and, in turn, determine which element of the structure has been selected based upon information relating to the structure that defines the plurality of elements of the structure and their relative position and orientation within the structure.

As such, the computing device 40 also generally includes a memory 46 for storing information relating to the structure 12. In one embodiment, for example, the memory may store the computer aided design (CAD) drawings of the structure and its constituent elements such that the particular element of the structure that has been selected by the part selection element can be determined by the computing device with reference to the CAD drawings which, among other things, define the position and the orientation of each element with respect to one another. Similarly, in instances in which the element that is selected by the part selection element is disposed at a depth within the structure, the computing device can take into account the depth of the element within the structure and determine the respective element based upon the information relating to the structure, such as the CAD drawings of the structure stored by the memory of the computing device.

Once the computing device 40 has identified the element of the structure 12 that has been selected, the computing device can inform the user of the identity of the element or otherwise provide information to the user relating to the selected element. For example, the computing device can provide the identity of the selected element to the part selection element 16 such that the identity of the selection element can be displayed for the user upon the display 34. As such, the system and method of this embodiment can be utilized for training purposes with a user being able to identify different elements of an actual structure and to, in turn, learn the identity of the respective elements. While useful for training, the system 10 and method of this embodiment may also be useful on a wide variety of other applications, such as during an inspection in which an inspector wishes to confirm the identity of an element prior to the inspection. In addition to merely providing the identity of the selected element, the computing device can also provide other information relating to the selected element, such as the CAD drawings of the selected element which may similarly be displayed by the part selection element for the user. Additionally, the memory 46 of the computing device may include other information relating to the selected element which may be provided to the user. For example, the memory may include information regarding a maintenance procedure for the selected element. As such, the computing device may provide all or at least a portion of the maintenance procedure to the part selection element for display to the user in order to facilitate the performance of the maintenance procedure upon the structure by the user. By way of further example, the memory of the computing device may include inventory information including, for example, the number of spare elements of the same type as that selected that are on hand. This information may be similarly provided to the part selection element for display to the user such that the user can receive very timely and updated information relating to the particular element of the structure that has been selected by the user via the part selection element.

Figure 3:
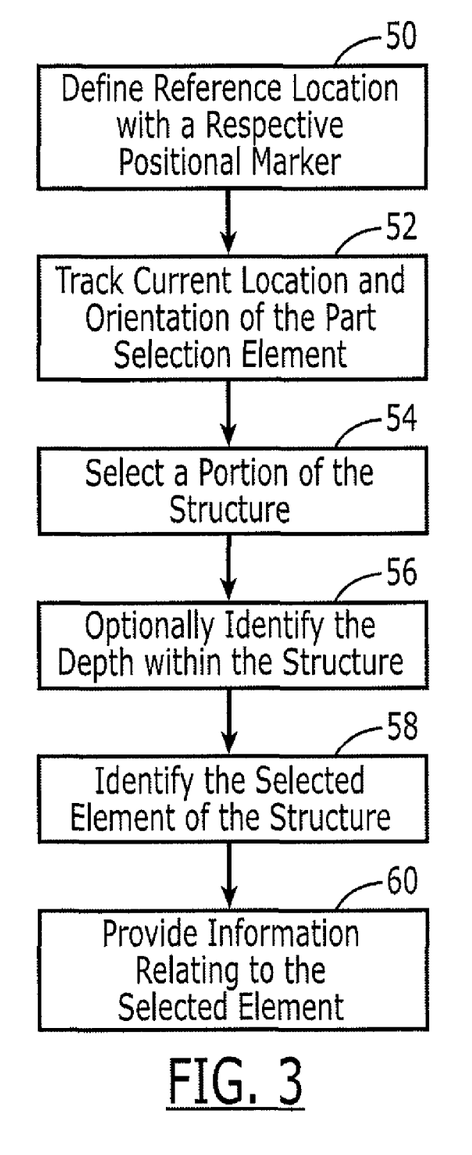
FIG. 3 is a flow chart depicting operations performed in accordance with the system and method of one embodiment of the present invention.

As depicted in FIG. 3, for example, a method in accordance with one aspect of the present invention may initially define a reference location for the part selection element 16, such as by positioning the part selection element proximate to or in contact with a respective positional marker 14 that, in turn, has a predetermined location. See block 50. Thereafter, the movement of the part selection element may be tracked so as to determine the current location and orientation of the part selection element as the part selection element is positioned with respect to the structure 12. See block 52. Once the part selection element is appropriately positioned relative to the structure, at least a portion of the structure, such as an element of the structure, is selected, such as by pointing the part selection element at the intended portion of the structure and, in some embodiments, triggering the selection, such as by actuating a predefined hard or soft key of the user interface 32. See block 54. Thereafter, an element of the structure may be identified based upon the current position and orientation of the part selection element, the location and orientation of the structure and that portion of the structure that has been selected. See block 58. As described above, information relating to the structure including the relative positions and the orientations of the constituent elements of the structure may be stored for reference in order to identify the element of the structure that has been selected. Thereafter, the identity of the selected element and/or other information associated with the selected element, such as CAD drawings, maintenance procedures or the like, may be provided to facilitate, for example, training, assembly, maintenance and inspection or other procedures. See block 60.

Many modifications and other embodiments of the inventions set forth herein will come to mind to one skilled in the art to which these inventions pertain having the benefit of the teachings presented in the foregoing descriptions and the associated drawings. For example, some of the processing functionality described above in conjunction with the part selection element 16 and the computing device 40 may be alternatively performed by the other of the part selection element and the computing device, if so desired. By way of example and as described above, the part selection element may be configured to determine both the current position and the current location of the part selection element. For example, the initial measurement unit 30 may include a processor that determines the current location and orientation of the part selection element or the initial measurement unit may provide the underlying data representative of the current position and the current location to the processor 20 of the part selection element which, in turn, determines the current position and orientation of the part selection element.

Alternatively, the initial measurement unit may provide the data from the accelerometers, the gyroscopes and the magnetic sensors to the computing device 40 which, in turn, determines the current location and position of the part selection element. Similarly, in instances in which the positional marker 14 provides its identity, either the part selection element or the computing device may determine the location of the positional marker based upon prestored information that associate each positional marker with a respective location. By way of another example, the positional marker 14 is described to include a transceiver 24. Alternatively, the positional marker may instead merely include a transmitter for providing its predefined location and/or its identity. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system comprising:
   a part selection element configured to interact with at least one positional marker having a predefined location, the part selection element also configured to select at least a portion of a structure that is positioned at a predetermined location and orientation; and
   a computing device comprising memory for storing information relating to the structure, said computing device in communication with the part selection element and configured to identify an element of the structure based upon a position and orientation of the part selection element and the portion of the structure selected by the part selection element and further based upon the information stored by the memory relating to the structure,
   wherein at least one of the part selection element or the computing device is also configured to determine both the position of the part selection element relative to the predefined location of a respective positional marker and an orientation of the part selection element.

2. A system according to claim 1 wherein the computing device is configured to provide information regarding the element of the structure based upon the information that is stored relating to the structure.

3. A system according to claim 2 wherein the memory is configured to store information relating to computer aided design (CAD) drawings of the structure, and wherein the computing device is configured to identify the element of the structure by providing a CAD drawing of the element.

4. A system according to claim 1 wherein the part selection element is also configured to identify a depth within the structure, and wherein the computing device is also configured to identify the element of the structure at the depth identified within the structure.

5. A system according to claim 1 wherein the part selection element comprises a pointing device.

6. A system according to claim 1 further comprising at least one positional marker having a predefined position and configured to communicate with the part selection element.

7. A system according to claim 6 wherein the at least one positional marker and the structure are disposed in a predefined positional relationship with respect to one another.

8. A method comprising:
   storing information relating to a structure;
   determining both a position of a part selection element relative to a predefined location of a respective positional marker and an orientation of the part selection element;
   selecting at least a portion of the structure that is positioned at a predetermined location and orientation; and
   identifying an element of the structure based upon the position and orientation of the part selection element and the portion of the structure identified by the part selection element and further based upon the information that is stored relating to the structure.

9. A method according to claim 8 further comprises providing information regarding the element of the structure based upon the information that is stored relating to the structure.

10. A method according to claim 9 wherein storing information relating to the structure comprises storing information relating to computer aided design (CAD) drawings of the structure, and wherein identifying the element of the structure further comprises identifying the element of the structure by providing a CAD drawing of the element.

11. A method according to claim 8 wherein selecting at least a portion of the structure comprises identifying a depth within the structure, and wherein identifying the element of the structure comprises identifying the element of the structure at the depth identified within the structure.

12. A method according to claim 8 wherein selecting at least a portion of the structure comprises pointing at the portion of the structure.

13. A method according to claim 8 wherein the positional marker and the structure are disposed in a predefined positional relationship with respect to one another.

14. A system comprising:
   a part selection element configured to select at least a portion of a structure that is positioned at a predetermined location and orientation, the part selection element also configured to identify a depth within the structure; and
   a computing device in communication with the part selection element and configured to identify an element of the structure at the depth identified within the structure based upon a position and orientation of the part selection element and the portion of the structure selected by the part selection element,
   wherein at least one of the part selection element or the computing device is also configured to determine both the position of the part selection element relative to the predefined location of a respective positional marker and an orientation of the part selection element.

15. A system according to claim 14 wherein the computing device further comprises memory for storing information relating to the structure, and wherein the computing device is configured to identify the element of the structure based upon the information stored by the memory relating to the structure.

16. A system according to claim 15 wherein the memory is configured to store information relating to computer aided design (CAD) drawings of the structure, and wherein the computing device is configured to identify the element of the structure by providing a CAD drawing of the element.

17. A system according to claim 15 wherein the memory is configured to store information relating to a maintenance procedure for the structure, and wherein the computing device is configured to identify the element of the structure by providing at least a portion of the maintenance procedures relating to the element.

18. A system according to claim 14 wherein the part selection element comprises a pointing device.

19. A system according to claim 14 further comprising at least one positional marker having a predefined position and configured to communicate with the part selection element, wherein the part selection element is configured to determine the position of the part selection element at least partially based upon the predefined position of the at least one positional marker.

20. A system according to claim 19 wherein the at least one positional marker and the structure are disposed in a predefined positional relationship with respect to one another.

* * * * *